(12) United States Patent
Liu et al.

(10) Patent No.: US 11,668,557 B2
(45) Date of Patent: *Jun. 6, 2023

(54) SYSTEM AND METHOD FOR ENHANCING DATA PROCESSING THROUGHPUT USING LESS EFFECTIVE PIXEL WHILE MAINTAINING WAFER WARP COVERAGE

(71) Applicant: KLA Corporation, Milpitas, CA (US)

(72) Inventors: Helen (Heng) Liu, Fremont, CA (US); Guoqing Zhang, Milpitas, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,537

(22) Filed: May 14, 2021

(65) Prior Publication Data

US 2021/0270598 A1 Sep. 2, 2021

Related U.S. Application Data

(63) Continuation of application No. 16/688,539, filed on Nov. 19, 2019, now Pat. No. 11,035,665.

(60) Provisional application No. 62/880,341, filed on Jul. 30, 2019.

(51) Int. Cl.
*G01B 11/06* (2006.01)
*G06F 3/04842* (2022.01)

(52) U.S. Cl.
CPC ...... *G01B 11/0608* (2013.01); *G06F 3/04842* (2013.01)

(58) Field of Classification Search
CPC .................................................. G01B 11/0608
See application file for complete search history.

(56) References Cited

U.S. PATENT DOCUMENTS

| 6,703,835 | B2 | 3/2004 | Patch et al. |
| 6,847,458 | B2 | 1/2005 | Freischlad et al. |
| 8,463,077 | B1 | 6/2013 | Weng et al. |
| 8,643,847 | B1 | 2/2014 | Chen |
| 8,949,057 | B1 | 2/2015 | Seong et al. |
| 9,121,684 | B2 | 9/2015 | Tang et al. |
| 10,352,691 | B1 | 7/2019 | Chen et al. |
| 11,035,665 | B2 * | 6/2021 | Liu ................... G01B 11/0608 |

(Continued)

OTHER PUBLICATIONS

PCT International Search Report and Written Opinion for International Application No. PCT/US2020/043924 dated Oct. 30, 2020, 11 pages.

*Primary Examiner* — Michael A Lyons
(74) *Attorney, Agent, or Firm* — Suiter Swantz pc llo

(57) ABSTRACT

An inspection system is disclosed. In one embodiment, the inspection system includes an interferometer sub-system configured to acquire an interferogram of a sample. The inspection system may further include a controller communicatively coupled to the interferometer sub-system. The controller is configured to: receive the interferogram from the interferometer sub-system; generate a phase map of the sample based on the received interferogram, wherein the phase map includes a plurality of pixels; select a sub-set of pixels of the plurality of pixels of the phase map to be used for phase unwrapping procedures; perform one or more phase unwrapping procedures on the sub-set of pixels of the phase map to generate an unwrapped phase map; and generate a surface height map of the sample based on the unwrapped phase map.

18 Claims, 6 Drawing Sheets

(56) References Cited

U.S. PATENT DOCUMENTS

2012/0278036 A1* 11/2012 Da ................... G01B 11/25
702/167
2013/0202181 A1    8/2013 Lo et al.
2017/0241764 A1    8/2017 Liu et al.

* cited by examiner

SYSTEM AND METHOD FOR ENHANCING DATA PROCESSING THROUGHPUT USING LESS EFFECTIVE PIXEL WHILE MAINTAINING WAFER WARP COVERAGE

CROSS-REFERENCE TO RELATED APPLICATION

The present application constitutes a continuation of and claims priority to U.S. patent application Ser. No. 16/688,539, filed on Nov. 19, 2019, which is non-provisional application of U.S. Provisional Application Ser. No. 62/880,341, filed on Jul. 30, 2019, whereby each of the patent applications listed above are incorporated herein by reference in their entirety.

TECHNICAL FIELD

The present invention generally relates to the field of metrology, and, more particularly, to a system and method measuring characteristics of samples using improved interferometric techniques.

BACKGROUND

Metrology methods based on interferometry have been used in the art of semiconductor fabrication in order to measure certain characteristics samples, including surface height and surface slope. For example, sample flatness/topography measurements (e.g., surface height measurements) may be measured using dual Fizeau interferometers which measure opposing sides of the sample surface topography simultaneously. The dynamic range (e.g., maximum measurable slope) of the sample warp is limited by the number and size of pixels within a pixelized sensor/detector assembly, as well as the optical resolution and transfer function of the system. In particular, sensor pixel size is an important characteristic to resolve dense fringes from sample areas with high surface slope. To achieve larger single-shot sample measurement coverage on high-warp samples, the sensor pixels must become smaller. However, smaller sensor pixel sizes result in significant increases in computational costs, as larger numbers of sensor pixels must be processed. As a result, assuming a constant computational power, the throughput of the interferometer system decreases with decreasing sensor pixel size. Therefore, it would be desirable to provide a system and method that cure the shortfalls of the previous approaches identified above.

SUMMARY

An inspection system is disclosed. In one embodiment, the inspection system includes an interferometer sub-system configured to acquire an interferogram of a sample. The inspection system may further include a controller communicatively coupled to the interferometer sub-system, the controller including one or more processors configured to execute a set of program instructions stored in a memory, the set of program instructions configured to cause the one or more processors to: receive the interferogram from the interferometer sub-system; generate a phase map of the sample based on the received interferogram, wherein the phase map includes a plurality of pixels; select a sub-set of pixels of the plurality of pixels of the phase map to be used for phase unwrapping procedures; perform one or more phase unwrapping procedures on the sub-set of pixels of the phase map to generate an unwrapped phase map; and generate a surface height map of the sample based on the unwrapped phase map.

An inspection system is disclosed. In one embodiment, the inspection system includes a controller including one or more processors configured to execute a set of program instructions stored in a memory, the set of program instructions configured to cause the one or more processors to: receive an interferogram of a sample; generate a phase map of the sample based on the received interferogram, wherein the phase map includes a plurality of pixels; select a sub-set of pixels of the plurality of pixels of the phase map to be used for phase unwrapping procedures; perform one or more phase unwrapping procedures on the sub-set of pixels of the phase map to generate an unwrapped phase map; and generate a surface height map of the sample based on the unwrapped phase map.

A method is disclosed. In one embodiment, the method includes: receiving an interferogram from an interferometer sub-system; generating a phase map of the sample based on the received interferogram, wherein the phase map includes a plurality of pixels; selecting a sub-set of pixels of the plurality of pixels of the phase map to be used for phase unwrapping; performing one or more phase unwrapping procedures on the sub-set of pixels of the phase map to generate an unwrapped phase map; and generating a surface height map of the sample based on the unwrapped phase map.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

In the context of interferometry, sensor pixel size is an important characteristic to resolve dense fringes from sample areas with high surface slope, along with optical resolution and transfer function of the system. To achieve larger single-shot sample measurement coverage on high-warp samples, the sensor pixels must become smaller. However, smaller sensor pixel sizes result in significant increases in computational costs, as larger numbers of sensor pixels must be processed. As a result, assuming a constant computational power, the throughput of the interferometer system decreases with decreasing sensor pixel size.

Accordingly, embodiments of the present disclosure are directed to a system and method which cure one or more shortfalls of the previous approaches identified above. Embodiments of the present disclosure are directed to an inspection system configured for improved data processing and phase unwrapping of interferograms. In particular, embodiments of the present disclosure are directed to an inspection system configured to generate a phase map based on interferometer of a sample, and generate a surface height map of the sample based on only a sub-set of pixels of the phase map. In particular, embodiments of the present disclosure are directed to an inspection system configured to perform the most computationally expensive phase unwrapping operations only on a sub-set of pixels of a phase map. By processing only a sub-set of pixels of the total number of pixels of a phase map, embodiments of the present disclosure may be able to improve data processing for interferometer systems, and increase semiconductor inspection throughput.

Referring generally to FIGS. 1-5, a system and method for interferometry is described, in accordance with one or more embodiments of the present disclosure.

Figure 1:
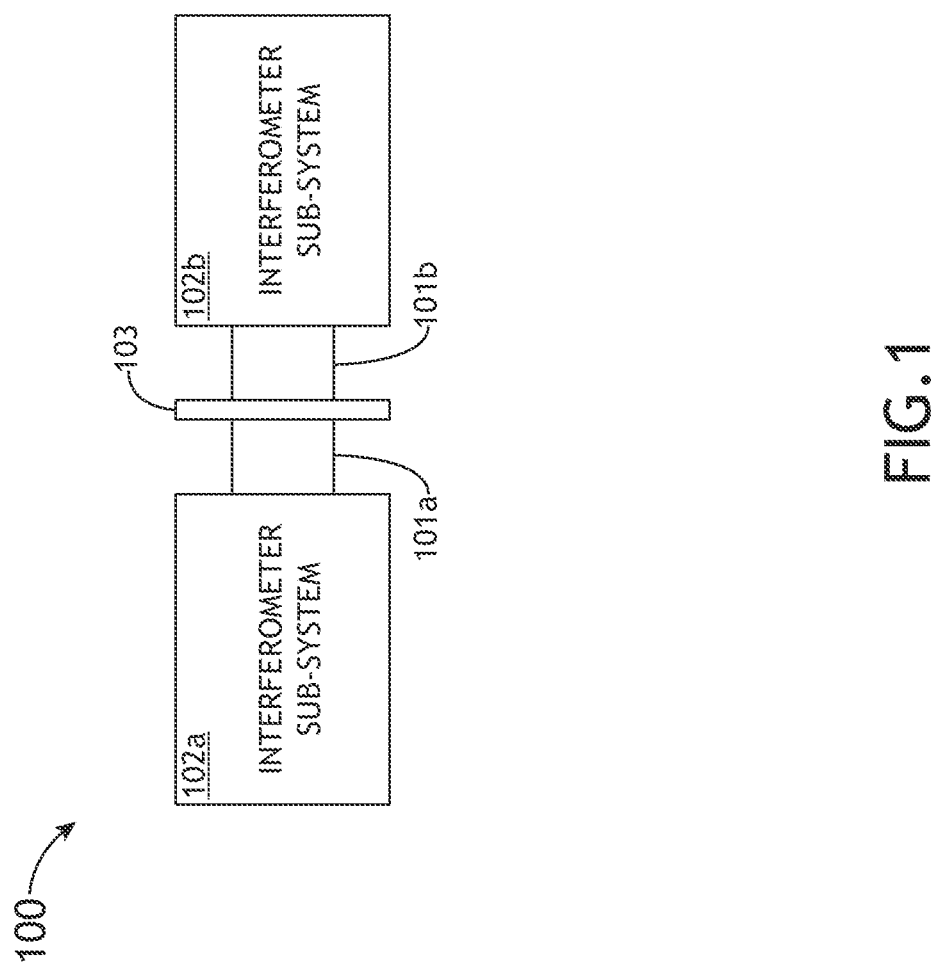
FIG. 1 illustrates a simplified block diagram of an inspection system, in accordance with one or more embodiments of the present disclosure.

FIG. 1 illustrates a simplified block diagram of an inspection system, in accordance with one or more embodiments of the present disclosure. The inspection system 100 may include, but is not limited to, one or more interferometer sub-systems 102 configured to perform one or more metrology and/or characterization processes on a sample 103.

In one embodiment, the inspection system 100 may include a dual interferometer system (e.g., dual Fizeau interferometer) configured to perform measurements on diametrically opposite sides of the sample 103. For example, inspection system 100 may include a first interferometer sub-system 102a configured to generate a first illumination beam 101a in order to perform one or more measurements on a first surface of the sample 103, and a second interferometer sub-system 102b configured to generate a second illumination beam 101b in order to perform one or more measurements on a second surface of the sample 103 opposite the first surface. In another embodiment, the first and second interferometer sub-systems 102a, 102b are configured to perform measurements on opposite sides of the sample 103 simultaneously. The first interferometer sub-system 102a and the second interferometer sub-system 102b may be identical, but they need not be identical in all embodiments.

The sample 103 may include any sample known in the art including, but not limited to, a wafer, a semiconductor wafer, a reticle, a mask, and the like. In one embodiment, the sample 103 may be disposed on/within a holding mechanism. For example, inspection system 100 may include a holding mechanism (not shown) configured to hold the sample 103 vertically (or substantially vertically), horizontally (or substantially horizontally), and the like.

Figure 2:
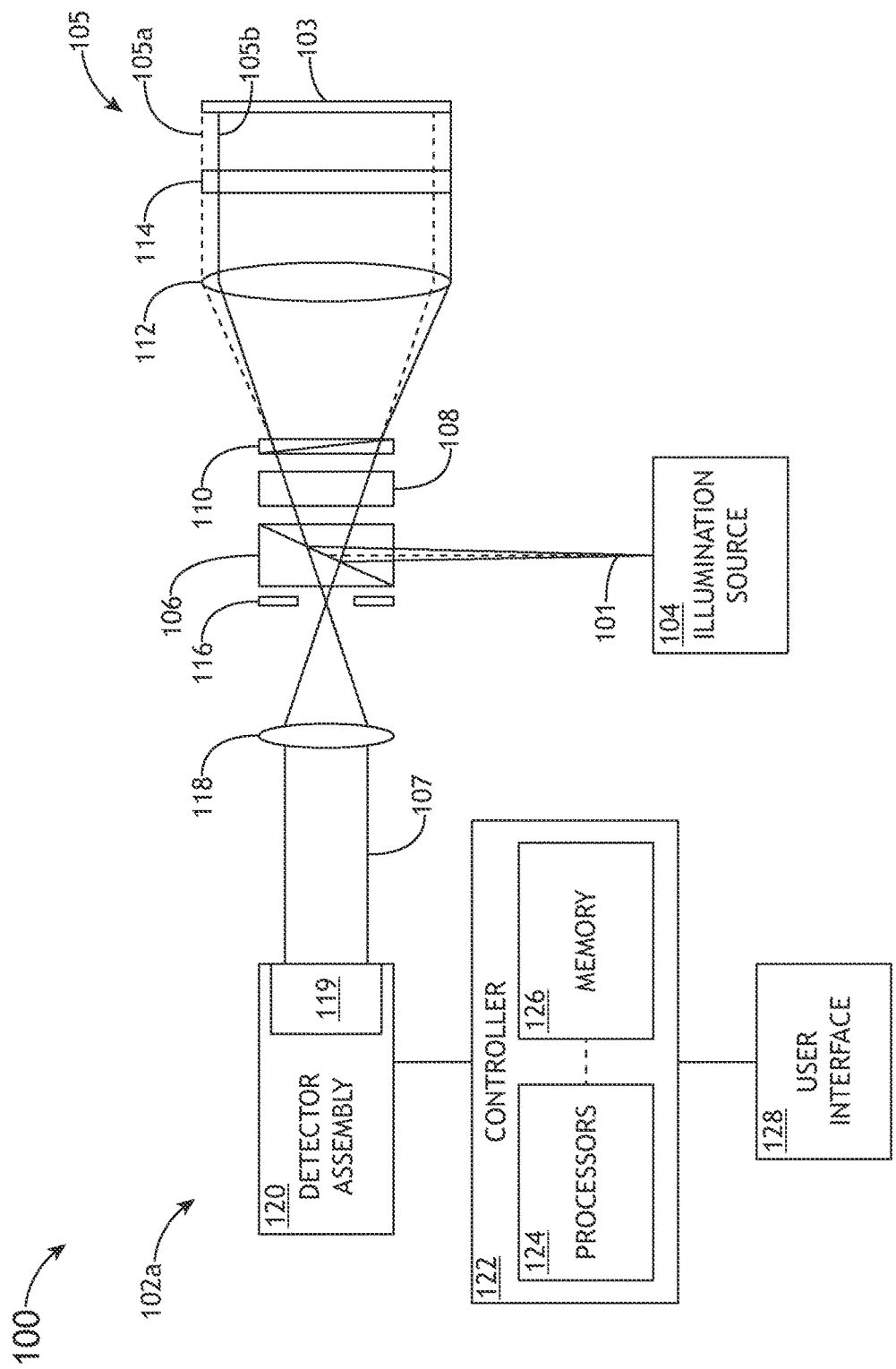
FIG. 2 illustrates a simplified block diagram of an interferometer sub-system of an inspection system, in accordance with one or more embodiments of the present disclosure.

FIG. 2 illustrates a simplified block diagram of an interferometer sub-system 102a of an inspection system, in accordance with one or more embodiments of the present disclosure. In this regard, the interferometer sub-system 102a depicted in FIG. 2 illustrates a single instance of the interferometer sub-system 102 depicted in FIG. 1.

In one embodiment, the interferometer sub-system 102a may include, but is not limited to, an illumination source 104 configured to generate an illumination beam 101, a beam splitter 106, a wave plate 108, a reference flat 114, a detector assembly 120 including one or more sensors 119, and a controller 122 including one or more processors 124 and a memory 126. The one or more processors 124 of the controller 122 may be configured to execute a set of program instructions stored in memory 126, the set of program instructions configured to cause the one or more processors to carry out various steps and processes of the present disclosure. In another embodiment, the interferometer sub-system 102a may include one or more components mounted on a translation stage (e.g., a chuck, or the like) to selectively include or remove the associated components.

It is contemplated herein that the interferometer sub-system 102a may include any interferometer sub-system known in the art including, but not limited to, a Fizeau interferometer sub-system 102a, a shearing interferometer sub-system 102a, and the like. In this regard, the interferometer sub-system 102a illustrated in FIG. 2 may be configured to perform surface height measurements and/or surface slope measurements. The use of Fizeau interferometry for wafer characterization is generally described in U.S. Pat. No. 6,847,458, filed on Mar. 20, 2003; U.S. Pat. No. 8,949,057, filed on Oct. 27, 2011; and U.S. Pat. No. 9,121,684. filed on Jan. 15, 2013, which are incorporated herein in their entirety.

The illumination source 104 may be configured to generate an illumination beam 101 of a selected wavelength. The illumination source 104 may include any illumination source known in the art including, but not limited to, a fiber laser, a fiber-coupled light source, a fiber-coupled semiconductor laser, and the like For example, the illumination source 104 may include, but is not limited to, any source capable of emitting illumination in the range of approximately 300 nm to 1500 nm.

In one embodiment, the polarizing beam splitter 106 may provide a linearly polarized portion of the illumination beam 101 to the wave plate 108 (e.g., half-wave plate 108) which may be rotated to rotate the polarization of the illumination beam 101 to any selected angle. The half-wave plate 108 may be configured to receive the illumination beam 101 polarized in a first direction, and convert the linear polarization to a circular polarization. In one embodiment, the illumination beam 101 is directed to the reference flat 114 (e.g., partially reflective reference flat 114) disposed proximate to the sample 103. In some embodiments, the beam splitter 106 and the half-wave plate 108 are configured to direct the illumination beam 101 to the reference flat 114 and sample 103 at a substantially normal incidence angle.

In one embodiment, the illumination beam 101 may be split by the reference flat 114 such that at least a portion of the illumination beam 101 reflects off a surface of the reference flat 114 (reference beam), and at least a portion of the illumination beam 101 is directed through the reference flat 114 so that it reflects off the surface of the sample 103 (sample beam). The reference beam and the sample beam may be subsequently recombined (e.g., recombined at the reference flat 114) and then directed to the one or more sensors 119 of the detector assembly 120. It is noted herein that the handedness of a circularly polarized beam switches (e.g. from left circular polarization to right circular polarization) upon reflection at a surface. Thus, the quarter-wave plate 108 may convert the circular polarization of the sample beam reflected from the sample 103 to a linear polarization oriented orthogonal to the first direction.

Subsequently, the detector assembly 120 (e.g., sensors 119 of the detector assembly 120) may capture one or more interference patterns between the reference beam and the sample beam (i.e. interferograms). In this regard, the modulated intensity of the interferogram is associated with variations of the optical path of the sample beam. It is noted herein that variations of the optical path may be attributable to variations in height of the sample 103 (e.g. due to the presence of a pattern) or variations in the refractive index along the path of the sample beam. Accordingly, the interference patterns (interferograms) may be indicative of the topology of the sample 103.

Multiple interferograms may be generated by the system 100 to determine the relative height of one or more locations on a sample 103. In this regard, the inspection system 100 may operate as a phase-shifting interferometer. It is noted herein that the multiple interferograms may be generated by any method known in the art. In one embodiment, multiple interferograms may be generated by the detector assembly 120 while translating a reference flat 114 in a direction normal to the sample 103. In another embodiment, multiple interferograms may be captured by a detector assembly 120 while a frequency of the illumination beam 101 generated by the illumination source 102 is swept across a range of frequencies.

In one embodiment, the interferometer sub-system 102a may further include one or more optical elements 112. The one or more optical elements 112 may include, but are not limited to, collimators, lenses, prisms, and the like. For instance, the one or more optical elements 112 may include, but is not limited to, an aspherical collimating lens. The one or more optical elements 112 may be configured to modify one or more characteristics of the illumination beam 101 including, but not limited to, a diameter of the illumination beam 101. In one embodiment, one or more optical elements 112 collimate a diverging illumination beam 101. In another embodiment, one or more optical elements 112 may be configured to direct and/or focus illumination propagated toward the detector assembly 120 such that interference fringes are overlaid on an image of the sample 103.

It is noted herein that various configurations and components of the inspection system 100 as described above and illustrated in FIGS. 1-2 are provided merely for illustration, and should not be interpreted as limiting. It is anticipated that a number of equivalent or additional optical configurations may be utilized within the scope of the present disclosure. In this regard, the inspection system 100 may include any number of additional and/or alternative optical elements without departing from the spirit and scope of the present disclosure including, but not limited to, circularly symmetric lenses, cylindrical lenses, beam shapers, mirrors, waveplates, polarizers, or filters and the like.

As noted previously herein, the inspection system 100 may include a controller 122 communicatively coupled to the detector assembly 120. In embodiments, the one or more processors 124 of the controller 122 may be configured to execute a set of program instructions stored in memory 126, the set of program instructions configured to cause the one or more processors to carry out various steps and processes of the present disclosure. For example, the one or more processors 124 of the controller 122 may be configured to: receive one or more acquired interferograms from the interferometer sub-system 102; generate a phase map of the sample 103 based on the received interferogram, wherein the phase map includes a plurality of pixels; select a sub-set of pixels of the plurality of pixels of the phase map to be used for phase unwrapping procedures; perform one or more phase unwrapping procedures on the sub-set of pixels of the phase map to generate an unwrapped phase map; and generate a surface height map of the sample 103 based on the unwrapped phase map. Each of these steps/functions will be addressed in turn.

In one embodiment, the controller 122 is configured to receive one or more interferograms of a sample 103. For example, the controller 122 may be configured to receive one or more phase-shifted interferometers from the detector assembly 120 of the interferometer sub-system 102a. In the context of dual Fizeau interferometers (as shown in FIG. 1), the controller 122 may be configured to receive a first interferogram of a first surface of the sample 103 from a first interferometer sub-system 102a, and a second interferogram of a second surface of the sample 103 from a second interferometer sub-system 102a. In some embodiments, an intensity map of a received interferogram may correspond to a modulated representation of a surface of the sample 103. The controller 122 may be configured to store the received interferograms in memory 126.

It is noted herein that the controller 122 may be configured to receive one or more interferometers from any source known in the art. Accordingly, the controller 122 may be configured to receive interferometers from sources other than the inspection sub-system 102 including, but not limited to, memory 126, an external storage device, a network, and the like.

In another embodiment, the controller 122 is configured to generate one or more phase maps of the sample 103 based on the one or more received interferograms. For example, upon receiving a single interferometer of a single surface of the sample 103, the controller 122 may be configured to generate a phase map of the surface of the sample 103 based on the received interferometer. The controller 122 may be configured to store the one or more generated phase maps in memory 126.

It is noted herein that phase maps generated by the controller 122 based on received interferograms may include a plurality of pixels. For example, a phase map generated by the controller 122 may include a plurality of pixels arranged in an m×n array. The number of pixels and/or the arrangement of the pixels within a generated phase map may be dependent upon, at least in part, the number of pixels of the detector assembly 120. In particular, the number/arrangement of pixels in generated interferometers and/or phase maps may be dependent upon the number of pixels of the one or more sensors 119 of the detector assembly 120. The number of pixels within an interferometer and/or phase map may be directly proportional to the number of pixels within the one or more sensors 119. For instance, increasing the number of pixels of the sensors 119/detector assembly 120 may result in phase maps with increased numbers of pixels, whereas decreasing the number of pixels of the sensors 119/detector assembly 120 may result in phase maps with decreased numbers of pixels.

The number of pixels within the detector assembly 120/sensors 119 may be dependent upon the level of resolution and/or throughput desired for the inspection system 100. Smaller pixel sizes may be able to achieve higher interferogram fringe resolution, which thereby results in higher resolution sample surface maps. However, when pixel size is decreased, higher numbers of pixels within the sensors 119 are required to characterize the same surface area of the sample 103. In other words, smaller pixels require higher numbers of pixels for the same sample 103 warp coverage. This may be further understood with reference to FIG. 3.

Figure 3:
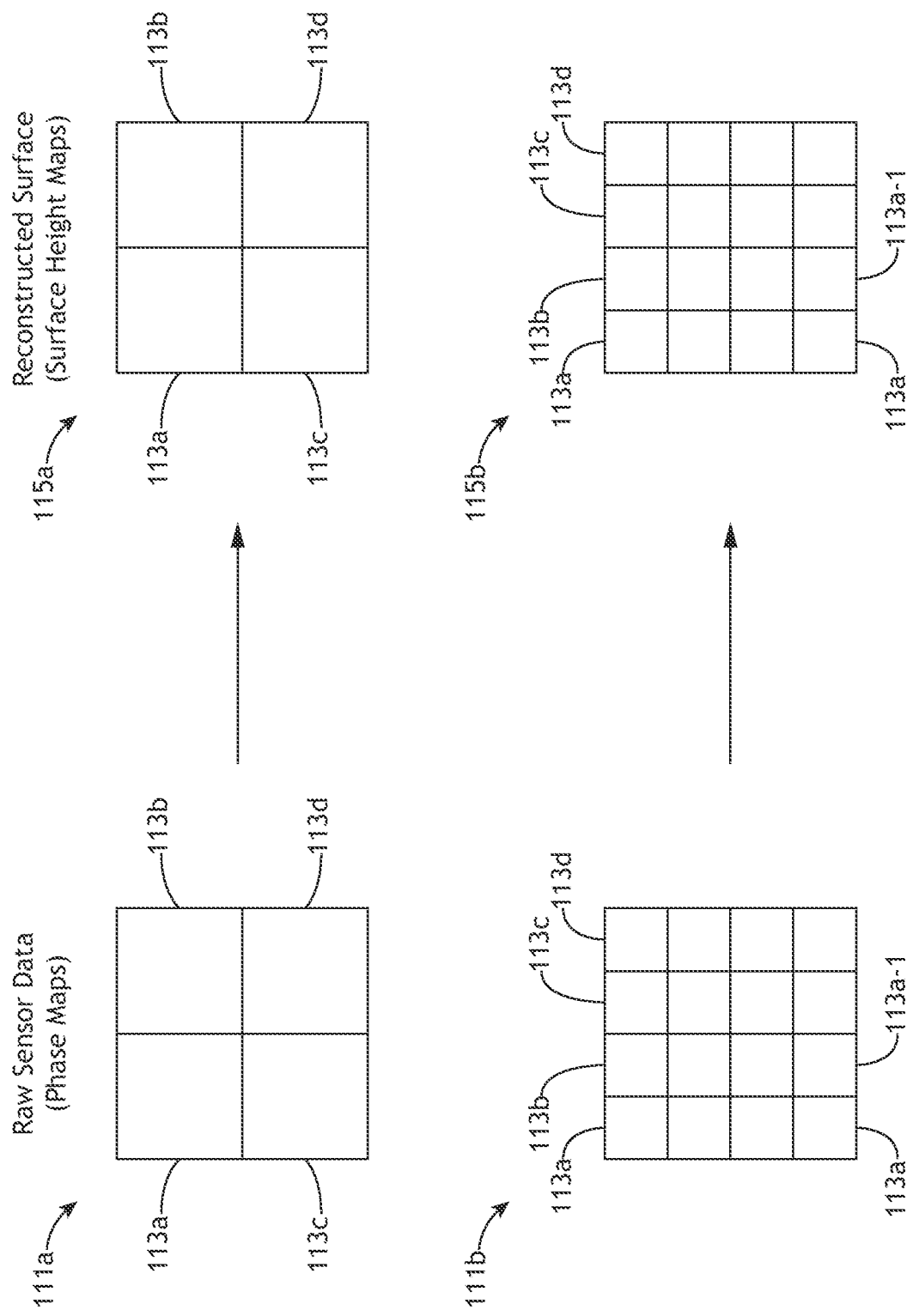
FIG. 3 illustrates phase maps and surface height maps generated by an inspection system, in accordance with one or more embodiments of the present disclosure.

FIG. 3 illustrates phase maps 113a, 113b and surface height maps 115a, 115b generated by an inspection system 100, in accordance with one or more embodiments of the present disclosure.

In FIG. 3, phase maps 111a, 111b (e.g., raw sensor 119 data) based on interferograms are shown on the left-hand side, and surface height maps 115a, 115b generated based on the phase maps 111a, 111b are shown on the right-hand side. As noted previously herein, varying numbers and/or arrangements of pixels within sensors 119 of the detector assembly 120 may result in varying numbers and/or arrangements of pixels 113a-113n within the phase maps 111a, 111b and surface height maps 115a, 115b. For example, the first phase map 111a including four separate pixels 113a-113d may be generated based on interferometers collected from a detector assembly 120 including sensors 119 with a relatively low number of pixels. By way of another example, the second phase map 111b including a plurality of pixels 113a-113n may be generated based on interferometers collected from a detector assembly 120 including sensors 119 with a larger number of pixels.

Comparing the first phase map 111a with the second phase map 111b, it may be appreciated that the second phase map 111b includes a larger number of pixels, wherein the pixels 113a-113n of the second phase map 111b are smaller than the pixels 113a-113d of the first phase map 111a. The larger number and smaller sized pixels 113a-113n of the second phase map 111b may result in a higher resolution (e.g., higher interferogram fringe resolution) as compared to the first phase map 111a. Accordingly, the second surface height map 115b based on the second phase map 111b may exhibit a higher pixel count and a higher resolution as compared to the first surface height map 115a based on the first phase map 111a.

However, decreasing the pixel size and increasing the pixel count to achieve higher resolution phase maps and surface height maps requires increasing data processing complexity and processing power. In particular, the data processing requirements to generate the second surface height map 115b from the second phase map 111b may be much greater and more complex than the data processing requirements to generate the first surface height map 115b from the first phase map 111a. The increased data processing complexity (e.g., more complex data processing algorithms) and required processing power is attributable to the increased number of pixels 113. For example, in order to generate the surface height map 115b, the processors 124 of the controller 122 must process four times as many pixels 113a-113n as compared to the first surface height map 115a. Assuming constant processing power capabilities, increased data processing complexity results in decreased throughput.

Accordingly, embodiments of the present disclosure are directed to a system configured to execute data processing algorithms configured to generate surface height maps based on only a portion of the total pixels 113 of a phase map 111. By avoiding the need to process each and every pixel simultaneously (at least for the most expensive operations of phase unwrapping), embodiments of the present disclosure may enable improved interferogram fringe resolution achieved through higher pixel counts while maintaining the same sample 103 warp coverage. In particular, the system of the present disclosure may utilize improved data processing algorithms in order to achieve high resolution surface height maps 115 while maintaining high throughput.

Accordingly, in another embodiment, the controller 122 is configured to select a sub-set of pixels of the plurality of pixels 113a-113n of the phase map 111 to be used for phase unwrapping procedures. This may be further understood with reference to FIG. 4A.

Figure 4A:
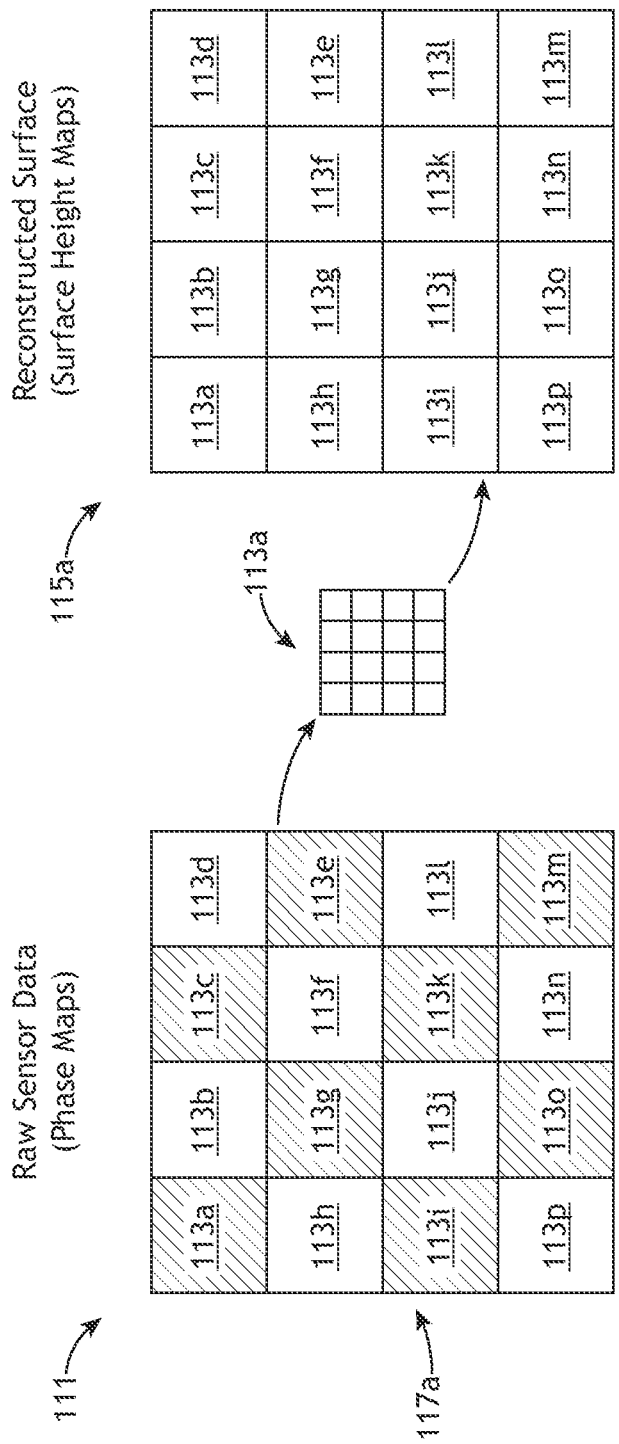
FIG. 4A illustrates a first surface height map generated based on a first sub-set of pixels of a phase map, in accordance with one or more embodiments of the present disclosure.

FIG. 4A illustrates a first surface height map 115a generated based on a first sub-set of pixels 117a of a phase map 111, in accordance with one or more embodiments of the present disclosure.

As shown in FIG. 4A, the controller 122 may generate the phase map 111 including a plurality of pixels 113a-113p. The phase map 111 may be stored in memory 126. Subsequently, the controller 122 may be configured to select a first sub-set of pixels 117a which will be used for phase unwrapping procedures and operations. For example, as shown in FIG. 4A, the controller 122 may select a first sub-set of pixels 117a of the plurality of pixels 113a-113p, wherein the first sub-set of pixels 117a includes pixels 113a, 113c, 113e, 113g, 113i, 113k, 113m, and 113o.

The sub-set(s) of pixels (e.g., first sub-set of pixels 117a) may be selected according to any technique, algorithm, or equation known in the art. For example, as shown in FIG. 4A, the controller 122 may be configured to select the first-sub set of pixels 117a by selecting every other pixel 113 of the plurality of pixels 113a-113p of the phase map 111. In this example, every other pixel 113 of the plurality of pixels 113a-113n of the phase map 111 would be included within the sub-set of pixels 117a. By way of another example, the controller 122 may be configured to select the first-sub set of pixels 117a by selecting one pixel 113 of every N pixels 113 to be included within the sub-set of pixels 117a, wherein N is greater than two. For instance, the controller 122 may be configured to select every third pixel 113, every fourth pixel 113, and the like. By way of another example, a user may be able to manually select a sub-set of pixels 117 by inputting one or more control commands to a user input device of the user interface 128, wherein the one or more input commands are indicative of a sub-set of pixels 117.

By way of another example, the controller 122 may be configured to select the sub-set of pixels 117 randomly, in a defined pattern, in an adaptive fashion based on data quality, and the like. By way of another example, the controller 122 may be configured to select the sub-set of pixels 117 by selecting a plurality of pixels 113 within a selected region (e.g., quadrant) of the phase map 111. It is noted herein that the first sub-set of pixels 117a is provided solely for example, and is not to be regarded as limiting, unless noted otherwise herein.

In another embodiment, after selecting a first sub-set of pixels 117a, the controller 122 may perform one or more phase unwrapping procedures on the sub-set of pixels 117a of the phase map 111 to generate a first unwrapped phase map 113a. Phase unwrapping procedures and/or phase retrieval algorithms may be performed on the first sub-set of pixels 117a in order to correct phase discontinuities associated with the wrapped phase map 111, and to extract phase and amplitude data from the wrapped phase map 111. The one or more phase unwrapping procedures may include any unwrapping procedure/operation known in the art for unwrapping wrapped phase maps 111 including, but not limited to, a minimum norm procedure, a path following procedure, a Flynn minimum discontinuity procedure, a quality guided phase unwrapping procedure, a phase unwrapping via max flows (PUMA) procedure, and the like. Program instructions for the one or more phase unwrapping procedures may be stored in memory 126. The controller 122 may be configured to store the first unwrapped phase map 113a in memory 126.

Different types of phase unwrapping procedures exhibit varying computational costs. Additionally, different stages (e.g., different operations) of a phase unwrapping procedure may exhibit varying computational costs. In this regard, and in order to further enhance efficiency and throughput, some embodiments of the present disclosure are directed to a multi-resolution phase unwrapping approach. Under a multi-resolution phase unwrapping approach, phase unwrapping procedures for the most computationally expensive steps/procedures of a phase unwrapping process (e.g., sequential/global unwrapping operations) may be performed only on a sub-set of pixels 117a of a phase map 111. Subsequently, phase unwrapping procedures for less computationally expensive operations (e.g., local unwrapping operations) may be performed in order to restore the details of the full map. It is contemplated herein that the various phase unwrapping procedures of a multi-resolution phase unwrapping approach may be performed in series (e.g., sequentially) and/or in parallel (e.g., simultaneously).

It is noted herein that conventional phase unwrapping procedures require the phase change between adjacent pixels 113 to be less than pi ($\pi$). Accordingly, phase changes between adjacent pixels 113 which are greater than $\pi$ may result in the failure of conventional phase unwrapping procedures. Comparatively, by selecting only one pixel 113 out of every N pixels 113 to be included within the first sub-set of pixels 117a, the phase unwrapping procedures may be more likely to fail. Performing phase unwrapping procedures on every 1 of N pixels 113 of the phase map 111 effectively requires the phase change between adjacent pixels 113 of the phase map 111 to be less than $\pi/N$. In this regard, performing phase unwrapping procedures using only a sub-set of pixels 117 of the plurality of pixels 113a-113n of a phase map 111 may result in more stringent phase unwrapping requirements.

Accordingly, in order to maintain these more stringent phase unwrapping requirements, the phase unwrapping procedures of the present disclose may assume a certain smoothness and/or homogeneity of the sample 103. In some embodiments, the $\pi/N$ phase change limitation between adjacent pixels 113 may be achieved by unwrapping back surface slope of the sample 103 rather than the back surface, and by unwrapping pseudo sample 103 thickness rather than front surface. Additionally, data from metrology use cases may allow valid assumptions to be made regarding sample 103 characteristics, thereby enabling phase unwrapping on a converted map representing thickness, slope, etc. in order to avoid the $\pi/N$ phase change limitation.

In another embodiment, the controller 122 may be configured to generate a surface height map 115a of the sample 103 based on the unwrapped phase map 113a. The controller 122 may be configured to utilize any algorithm, equation, or mathematical technique known in the art in order to generate the surface height map 115a based on the unwrapped phase map 113a. In some embodiments, the surface height map 115a may be proportional to the unwrapped phase map 113a. In additional and/or alternative embodiments, if a particular use case does not require restoration of the full pixel map, the surface height map 115a may exhibit an effective pixel size of N*fSensorPixelSize. In this regard, less pixels may be used to establish final metrology metric, such as global wafer warp, site NT mean, and the like. The controller 122 may be configured to store the first unwrapped phase map 113a in memory 126.

In some embodiments, the controller 122 may be configured to determine one or more characteristics of the sample 103 based on the surface height map 115a. Characteristics of the sample 103 which may be determined based on the surface height map 115a may include, but are not limited to, surface height measurements of the sample 103, surface slope measurements of the sample 103, and the like. In additional and/or alternative embodiments, the controller 122 may be further configured to generate one or more control signals configured to selectively adjust one or more characteristics of one or more process tools based on the one or more determined characteristics of the sample 103. For example, upon determining one or more characteristics of the sample 103, the controller 122 may generate one or more feed-forward and/or feedback control signals configured to adjust one or more upstream and/or downstream process tools. Process tools which may be adjusted may include, but are not limited to, an etching tool, a lithography tool, a deposition tool, a polishing tool, and the like.

In some embodiments, the controller 122 may be configured to perform multiple phase unwrapping procedures on a single phase map 111. This may be further understood with reference to FIG. 4B.

Figure 4B:
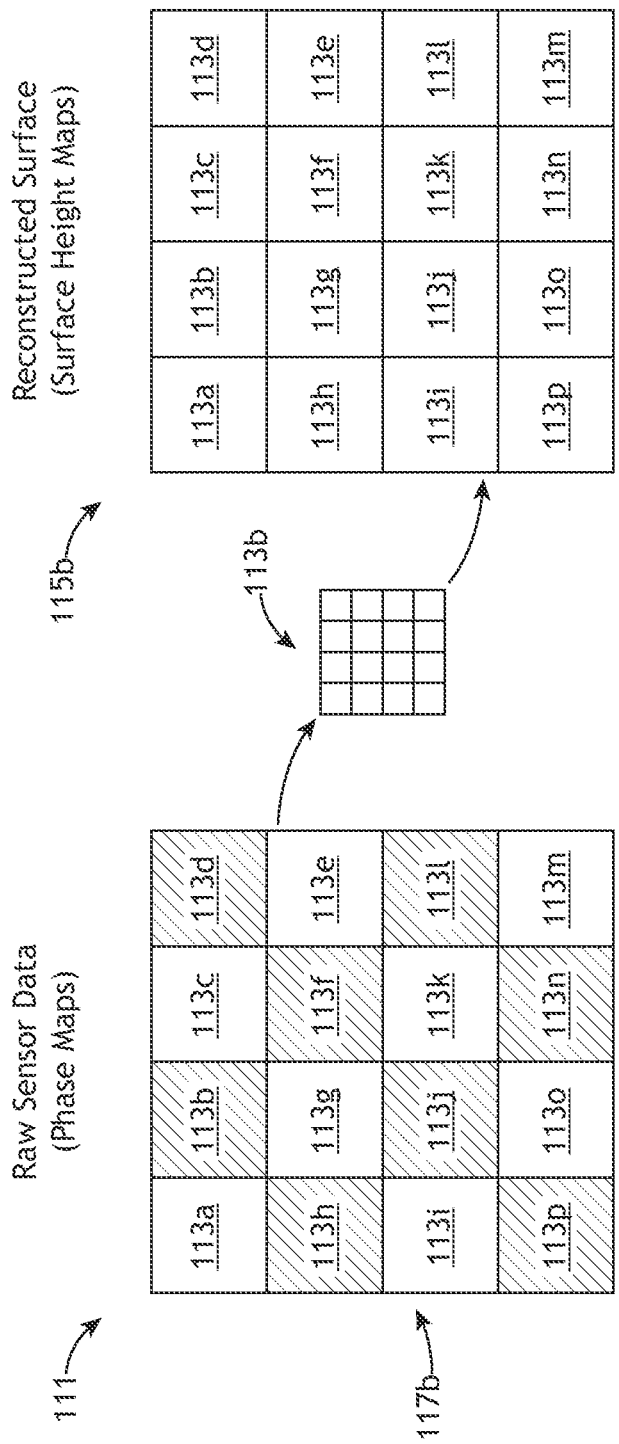
FIG. 4B illustrates a second surface height map generated based on a second sub-set of pixels of the phase map, in accordance with one or more embodiments of the present disclosure.

FIG. 4B illustrates a second surface height map 115b generated based on a second sub-set of pixels 117b of the phase map 111, in accordance with one or more embodiments of the present disclosure. In particular, FIG. 4B may illustrate the same phase map 111 illustrated in FIG. 4A.

In some embodiments, the controller 122 may be configured to select an additional sub-set of pixels 117 of the plurality of pixels 113a-113n of the phase map 111 to perform phase unwrapping procedures, wherein the additional sub-set of pixels 117 is different from the first sub-set of pixels 117a. For example, as shown in FIG. 4B, the controller 122 may select a second sub-set of pixels 117b selected for phase unwrapping procedures. In this example, the controller 122 may select the second sub-set of pixels 117b such that the second sub-set of pixels 117b includes pixels 113b, 113d, 113f, 113h, 113j, 113l, 113n, and 113p. As noted previously herein, the sub-set(s) of pixels (e.g., second sub-set of pixels 117b) may be selected according to any technique, algorithm, or equation known in the art. For example, as shown in FIG. 4B, the controller 122 may be configured to select the first-sub set of pixels 117b by selecting every other pixel 113 of the plurality of pixels 113a-113p of the phase map 111.

Comparing the first sub-set of pixels 117a to the second sub-set of pixels 117b, it may be seen that the second sub-set of pixels 117b includes each pixel 113 of the plurality of pixels 113a-113p of the phase map 111 which were not selected for the first sub-set of pixels 117a. While selecting the first and second sub-sets of pixels 117a, 117b in such a manner may allow for each pixel 113 of the phase map 111 to be unwrapped in two "iterations" of phase unwrapping procedures, this is not to be regarded as a limitation of the present disclosure, unless noted otherwise herein. In this regard, the second set of pixels 117b may be selected to include any number and/or arrangement of pixels 113. In some embodiments, the second sub-set of pixels 117b may include one or more pixels 113 which were included within the first sub-set of pixels 117b.

In another embodiment, after selecting the second sub-set of pixels 117b, the controller 122 may perform one or more phase unwrapping procedures on the second sub-set of pixels 117b of the phase map 111 to generate a second unwrapped phase map 113b. As noted previously herein, the one or more phase unwrapping procedures may include any unwrapping procedure/operation known in the art for unwrapping wrapped phase maps 111 including, but not limited to, a minimum norm procedure, a path following procedure, a Flynn minimum discontinuity procedure, a quality guided phase unwrapping procedure, a phase unwrapping via max flows (PUMA) procedure, and the like. Furthermore, as will be explained in further detail herein, the one or more phase unwrapping procedures used on the second sub-set of pixels 117b may include one or more additional and/or alternative phase unwrapping procedures utilized on the first sub-set of pixels 117a. In particular, the one or more phase unwrapping procedures used on the second sub-set of pixels 117b may include less computationally expensive phase unwrapping procedures as compared to the phase unwrapping procedures utilized on the first sub-set of pixels 117a. The controller 122 may be configured to store the second unwrapped phase map 113b in memory 126.

In another embodiment, the controller 122 may be configured to generate a second surface height map 115b of the sample 103 based on the unwrapped phase map 113b. The controller 122 may be configured to utilize any algorithm, equation, or mathematical technique known in the art in order to generate the second surface height map 115b based on the second unwrapped phase map 113b, or perform inexpensive local phase unwrapping to restore surface information of the phase map 111. The controller 122 may be configured to store the second unwrapped phase map 113b in memory 126. It is noted herein that the second surface height map 115b may exhibit slightly different characteristics than the first surface height map 115a. Variations between the respective surface height maps 115a-115n may be attributable to differences between the selected sub-sets of pixels 117a-117n.

It is further noted herein that the various phase unwrapping procedures performed in the various iterations may be dependent upon a number of factors including, but not limited to, areas of sample 103 which are of interest, the complexity of the phase unwrapping procedures, the computational cost of the phase unwrapping procedures, and the like. In particular, the controller 122 may be configured to perform the most computationally expensive phase unwrapping procedures first, then fill in the details with less computationally expensive phase unwrapping procedures in subsequent iterations.

For example, the controller 122 may be configured to perform a first set of one or more phase unwrapping procedures on the first sub-set of pixels 117a to generate the first surface height map 115a. In this example, the first set of one or more phase unwrapping procedures may include the most computationally expensive and/or complex phase unwrapping procedures which are to be performed. Subsequently, the controller 122 may be configured to perform a second set of one or more phase unwrapping procedures on the first sub-set of pixels 117a and/or a second sub-set of pixels 117b in order to generate the second surface height map 115a. In this example, the second set of one or more phase unwrapping procedures may include less computationally expensive phase unwrapping procedures than the first set of one or more phase unwrapping procedures.

In additional and/or alternative embodiments, the second set of phase unwrapping procedures may be configured to unwrap pixels of the phase map 111 based on the results/output of the previous set of phase unwrapping procedures. For example, the second set of phase unwrapping procedures may be configured to unwrap the remaining pixels not unwrapped by the first set of phase unwrapping procedures based on the results from the first set of phase unwrapping procedures (e.g., based on the first surface height map 115a). By basing the subsequent set of phase unwrapping procedures on the results/output of previous sets of phase unwrapping procedures, less computationally expensive phase unwrapping procedures/algorithms may be used for the subsequent phase unwrapping procedures. In this regard, subsequent sets of phase unwrapping procedures may be selected based on the results/output of previous sets of phase unwrapping procedures.

In additional and/or alternative embodiments, the controller 122 may be configured to selectively adjust one or more characteristics of the first surface height map 115a based on the second unwrapped phase map 113b and/or the second surface height map 115b. For example, the controller 122 may identify one or more characteristics and/or differences between the second surface height map 115b and the first surface height map 115a, and selectively adjust one or more characteristics of the first surface height map 115a based on the one or more identified characteristics and/or differences. In additional and/or alternative embodiments, the controller 122 may be configured to combine the first unwrapped phase map 113a and the second unwrapped phase map 113b to generate a "composite" surface height map 115. Similarly, in some embodiments, the controller 122 may be configured to generate a "composite" surface height map 115 by combining the first surface height map 115a and the second surface height map 115b.

It is noted herein that the first surface height map 115a and the second surface height map 115b may be generated sequentially (e.g., in series, one after another) and/or in parallel (e.g., simultaneously). In particular, based on data dependency, it is possible to compute surface height map 115a and surface height map 115b in parallel (e.g., simultaneously, or substantially simultaneously), and combine them together at the end.

While FIGS. 4A-4B are shown and described as carrying out only two iterations of phase unwrapping procedures, this is not to be regarded as a limitation of the present disclosure, unless noted otherwise herein. In this regard, the controller 122 may be configured to select any N number of sub-sets of pixels 117 in order to carry out N iterations of phase unwrapping procedures on a phase map 111.

It is contemplated herein that performing multiple iterations of phase unwrapping procedures utilizing sub-sets of pixels 117 may allow embodiments of the present disclosure to maintain phase and amplitude computations for all pixels of a phase map 111, while maintaining high throughput and resolution. Subsequent iterations of phase unwrapping procedures utilizing varying sub-sets of pixels 117 may allow the controller to guide the completion of the rest of the pixels 113 of a phase map 111 which were not unwrapped in previous iterations. In particular, by performing more computationally expensive phase unwrapping procedures on a sub-set of pixels 117, less computationally expensive phase unwrapping procedures may be done subsequently in order to improve throughput and restore the details of the full map not unwrapped during the first set of more computationally expensive phase unwrapping procedures. It is further contemplated herein that embodiments of the present disclosure may significantly improve data processing speed, without losing any sample 103 warp coverage enabled by smaller pixels, and without increasing data processing requirements.

It is noted herein that the one or more components of the disclosed inspection system 100 may be communicatively coupled to the various other components of the system in any manner known in the art. For example, the interferometer sub-system 102, controller 122, and user interface 128 may be communicatively coupled to each other and other components via a wireline (e.g., copper wire, fiber optic cable, and the like) or wireless connection (e.g., RF coupling, IR coupling, data network communication (e.g., WiFi, WiMax, 3G, 4G, 4G LTE, 5G, Bluetooth, and the like).

In one embodiment, the one or more processors 124 may include any one or more processing elements known in the art. In this sense, the one or more processors 124 may include any microprocessor-type device configured to execute software algorithms and/or instructions. In one embodiment, the one or more processors 124 may consist of a desktop computer, mainframe computer system, workstation, image computer, parallel processor, or other computer system (e.g., networked computer) configured to execute a program configured to operate the inspection system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 124. In general, the term "processor" may be broadly defined to encompass any device having one or more processing elements, which execute program instructions from memory 126. Moreover, different subsystems of the inspection system 100 (e.g., illumination source 104, detector assembly 120, controller 122, user interface 128) may include processor or logic elements suitable for carrying out at least a portion of the steps described throughout the present disclosure. Therefore, the above description should not be interpreted as a limitation on the present disclosure but merely an illustration.

The memory 126 may include any storage medium known in the art suitable for storing program instructions executable by the associated one or more processors 124 and the data received/generated by the inspection system 100. For example, the memory 126 may include a non-transitory memory medium. For instance, the memory 126 may include, but is not limited to, a read-only memory (ROM), a random-access memory (RAM), a magnetic or optical memory device (e.g., disk), a magnetic tape, a solid-state drive and the like. It is further noted that memory 126 may be housed in a common controller housing with the one or more processors 124. In an alternative embodiment, the memory 126 may be located remotely with respect to the physical location of the processors 124 and controller 122. In another embodiment, the memory 126 maintains program instructions for causing the one or more processors 124 to carry out the various steps described through the present disclosure.

In one embodiment, a user interface 128 is communicatively coupled to the controller 122. In one embodiment, the user interface 128 may include, but is not limited to, one or more desktops, tablets, smartphones, smart watches, or the like. In another embodiment, the user interface 128 includes a display used to display data of the inspection system 100 to a user. The display of the user interface 128 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 128 is suitable for implementation in the present disclosure. In another embodiment, a user may input selections and/or instructions responsive to data displayed to the user via the user interface 128.

Figure 5:
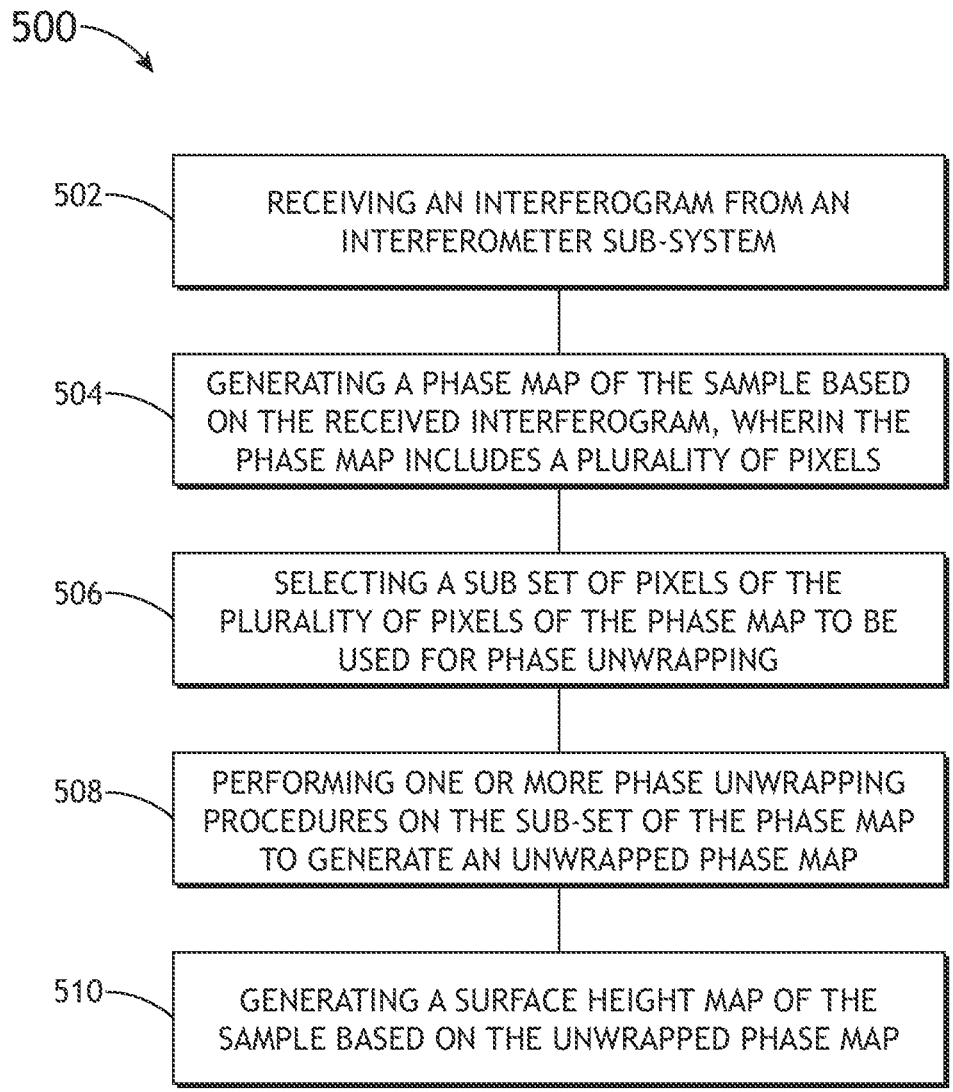
FIG. 5 illustrates a method for generating surface height maps of a sample using an inspection sub-system, in accordance with one or more embodiments of the present disclosure.

FIG. 5 illustrates a method for generating surface height maps of a sample using an inspection sub-system, in accordance with one or more embodiments of the present disclosure. It is noted herein that the steps of method 500 may be implemented all or in part by inspection system 100. It is further recognized, however, that the method 500 is not limited to the inspection system 100 in that additional or alternative system-level embodiments may carry out all or part of the steps of method 500.

In a step 502, an interferogram is received from an interferometer sub-system. For example, the controller 122 may be configured to receive one or more phase-shifted interferometers from the detector assembly 120 of the interferometer sub-system 102a. By way of another example, the controller 122 may be configured to receive interferometers from sources other than the inspection sub-system 102 including, but not limited to, memory 126, an external storage device, a network, and the like. I In a step 504, a phase map of the sample is generated based on the received interferogram. In embodiments, the phase map may include a plurality of pixels. For example, upon receiving a single interferometer of a single surface of the sample 103, the controller 122 may be configured to generate a phase map of the surface of the sample 103 based on the received interferometer. The controller 122 may be configured to store the one or more generated phase maps in memory 126.

In a step 506, a sub-set of pixels of the plurality of pixels of the phase map are selected to be used for phase unwrapping. For example, as shown in FIG. 4A, the controller 122 may select a first sub-set of pixels 117a of the plurality of pixels 113a-113p, wherein the first sub-set of pixels 117a includes pixels 113a, 113c, 113e, 113g, 113i, 113k, 113m, and 113o. The sub-set(s) of pixels (e.g., first sub-set of pixels 117a) may be selected according to any technique, algorithm, or equation known in the art. For example, the controller 122 may be configured to select the first-sub set of pixels 117a by selecting one pixel 113 of every N pixels 113 to be included within the sub-set of pixels 117a, wherein N is greater than two. For instance, the controller 122 may be configured to select every third pixel 113, every fourth pixel 113, and the like.

In a step 508, one or more phase unwrapping procedures are performed on the sub-set of pixels of the phase map to generate an unwrapped phase map.

In a step 510, a surface height map of the sample is generated based on the unwrapped phase map. Phase unwrapping procedures and/or phase retrieval algorithms may be performed on the first sub-set of pixels 117a in order to correct phase discontinuities associated with the wrapped phase map 111, and to extract phase and amplitude data from the wrapped phase map 111. The one or more phase unwrapping procedures may include any unwrapping procedure/operation known in the art for unwrapping wrapped phase maps 111 including, but not limited to, a minimum norm procedure, a path following procedure, a Flynn minimum discontinuity procedure, a quality guided phase unwrapping procedure, a phase unwrapping via max flows (PUMA) procedure, and the like.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An inspection system comprising:
an interferometer sub-system configured to acquire an interferogram of a sample; and
a controller communicatively coupled to the interferometer sub-system, the controller including one or more processors configured to execute a set of program instructions stored in a memory, the set of program instructions configured to cause the one or more processors to:
receive the interferogram from the interferometer sub-system;
generate a phase map of the sample based on the received interferogram, wherein the phase map includes a plurality of pixels;
select a first sub-set of pixels of the plurality of pixels based on data quality, wherein two or more pixels of the first sub-set of pixels are non-contiguous;
perform a first set of one or more phase unwrapping procedures based on the first sub-set of pixels of the phase map to generate an unwrapped phase map; and
generate a first surface height map of the sample based on the unwrapped phase map.

2. The inspection system of claim 1, wherein the controller is further configured to:
select an additional sub-set of pixels of the plurality of pixels of the phase map to be used for phase unwrapping procedures, the additional sub-set of pixels different from the first sub-set of pixels;
perform an additional set of one or more phase unwrapping procedures on the additional sub-set of pixels of the phase map to generate an additional unwrapped phase map; and
selectively adjust one or more characteristics of the first surface height map based on the additional unwrapped phase map.

3. The inspection system of claim 2, wherein the first set of one or more phase unwrapping procedures include one or more computationally expensive phase unwrapping procedures as compared to the additional set of one or more phase unwrapping procedures.

4. The inspection system of claim 2, wherein the additional set of one or more phase unwrapping procedures are selected based on the first surface height map.

5. The inspection system of claim 1, wherein the first set of one or more phase unwrapping procedures include at least one of a minimum norm procedure, a path following procedure, a Flynn minimum discontinuity procedure, a quality guided phase unwrapping procedure, or a phase unwrapping via max flows (PUMA) procedure.

6. The inspection system of claim 1, wherein the first surface height map is proportional to the unwrapped phase map.

7. The inspection system of claim 1, wherein an intensity map of the interferogram corresponds to a modulated representation of a surface of the sample.

8. The inspection system of claim 1, wherein the controller is further configured to:
determine one or more characteristics of the sample based on the first surface height map; and
generate one or more control signals configured to selectively adjust one or more characteristics of one or more process tools based on the one or more determined characteristics.

9. A system comprising:
a controller communicatively coupled to an interferometer sub-system, the controller including one or more processors and a memory, the one or more processors configured to execute a set of program instructions stored in memory, the set of program instructions configured to cause the one or more processors to:
receive an interferogram of a sample;
generate a phase map of the sample based on the received interferogram, wherein the phase map includes a plurality of pixels;
select a first sub-set of pixels of the plurality of pixels based on data quality, wherein two or more pixels of the first sub-set of pixels are non-contiguous;
perform a first set of one or more phase unwrapping procedures on the first sub-set of pixels of the phase map to generate an unwrapped phase map; and
generate a first surface height map of the sample based on the unwrapped phase map.

10. The system of claim 9, wherein the interferogram is received from the interferometer sub-system communicatively coupled to the controller.

11. The system of claim 9, wherein the controller is further configured to:
select an additional sub-set of pixels of the plurality of pixels of the phase map to be used for phase unwrapping procedures, the additional sub-set of pixels different from the first sub-set of pixels;
perform an additional set of one or more phase unwrapping procedures on the additional sub-set of pixels of the phase map to generate an additional unwrapped phase map; and
selectively adjust one or more characteristics of the first surface height map based on the additional unwrapped phase map.

12. The system of claim 11, wherein the first set of one or more phase unwrapping procedures include one or more computationally expensive phase unwrapping procedures as compared to the additional set of one or more phase unwrapping procedures.

13. The system of claim 11, wherein the additional set of one or more phase unwrapping procedures are selected based on the first surface height map.

14. The system of claim 9, wherein the first set of one or more phase unwrapping procedures include at least one of a minimum norm procedure, a path following procedure, a Flynn minimum discontinuity procedure, a quality guided phase unwrapping procedure, or a phase unwrapping via max flows (PUMA) procedure.

15. The system of claim 9, wherein the first surface height map is proportional to the unwrapped phase map.

16. The system of claim 9, wherein an intensity map of the interferogram corresponds to a modulated representation of a surface of the sample.

17. The system of claim 9, wherein the controller is further configured to:
 determine one or more characteristics of the sample based on the first surface height map; and
 generate one or more control signals configured to selectively adjust one or more characteristics of one or more process tools based on the one or more determined characteristics.

18. A method comprising:
 receiving an interferogram of a sample from an interferometer sub-system;
 generating a phase map of the sample based on the received interferogram, wherein the phase map includes a plurality of pixels;
 selecting a sub-set of pixels of the plurality of pixels based on data quality, wherein two or more pixels of the first sub-set of pixels are non-contiguous;
 performing one or more phase unwrapping procedures on the sub-set of pixels of the phase map to generate an unwrapped phase map; and
 generating a surface height map of the sample based on the unwrapped phase map.

* * * * *